Aug. 4, 1931.   N. SKILLMAN   1,817,529
METHOD OF FORMING A PERMANENT CONNECTING LINK
Filed Sept. 2, 1930   2 Sheets-Sheet 1
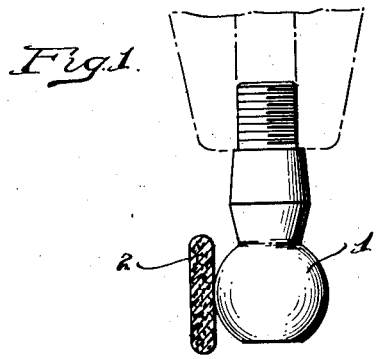
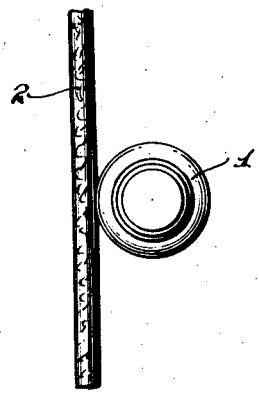
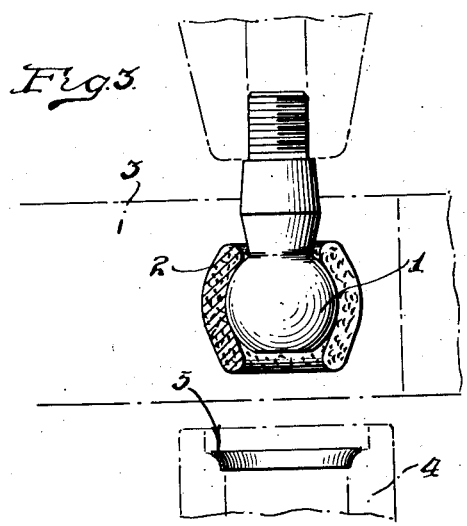
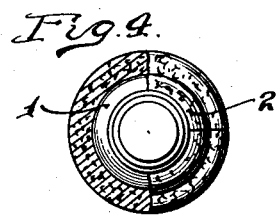
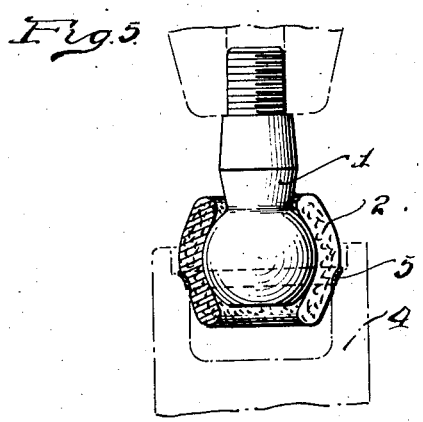
Inventor
NEWTON SKILLMAN,
By
Barnes & Kisselle
Attorneys

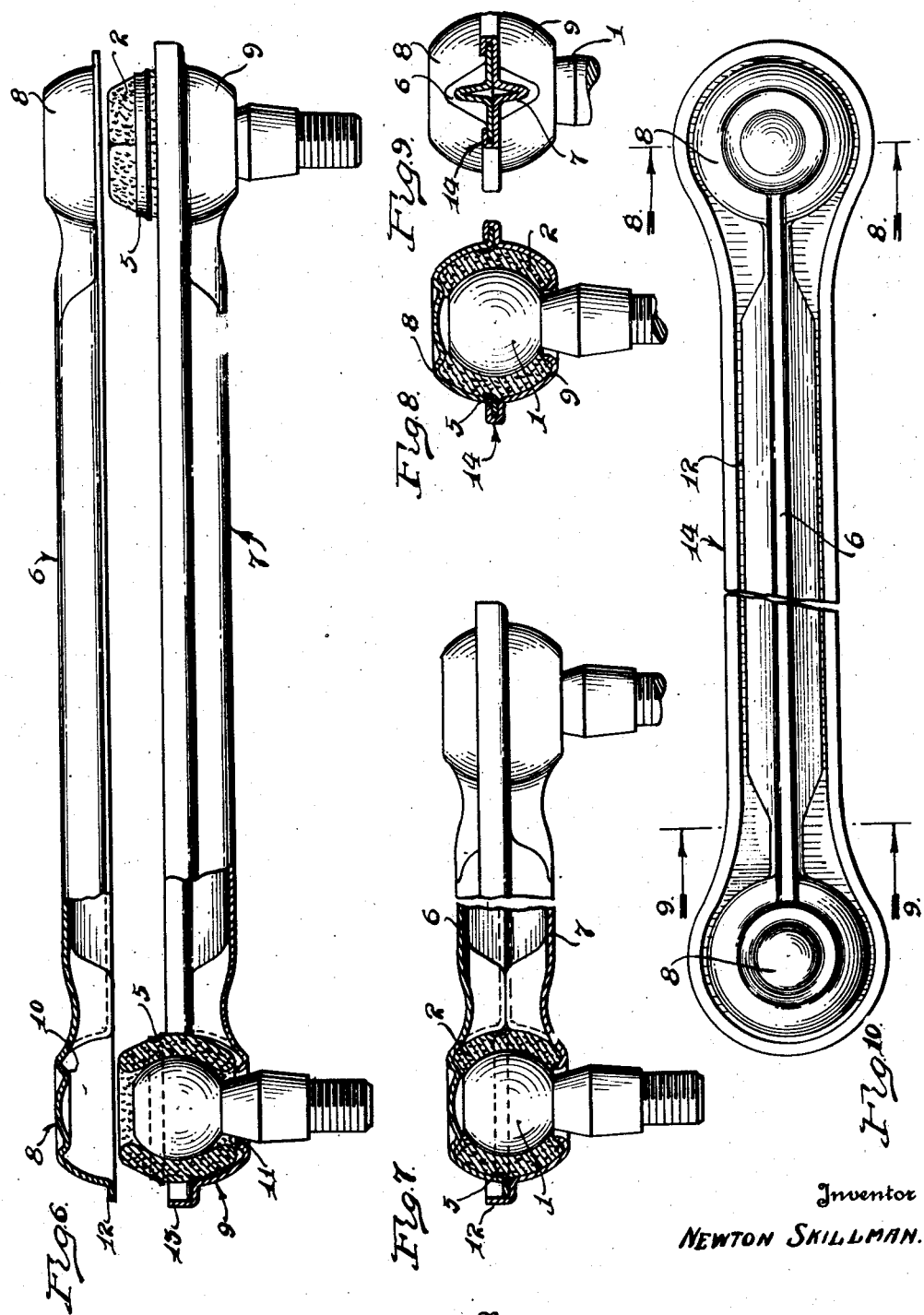

Patented Aug. 4, 1931

1,817,529

UNITED STATES PATENT OFFICE

NEWTON SKILLMAN, OF DETROIT, MICHIGAN, ASSIGNOR TO O. & S. BEARING COMPANY, OF DETROIT, MICHIGAN, A CORPORATION OF MICHIGAN

METHOD OF FORMING A PERMANENT CONNECTING LINK

Application filed September 2, 1930. Serial No. 479,399.

This invention relates to a permanent connecting link and method of forming the same, and has to do particularly with a unit of the type having spaced ball joints and a connecting link therebetween. This application is a continuation in part of my copending application Serial No. 412,682, filed December 9, 1929.

It is the object of the present invention to provide a connecting link assembly of the permanent integral type, the parts of which may be assembled and the ball joints permanently secured in position without distorting any portion of the bearing housing. One of the most important features in the assembly of connecting links of this type is the shaping and compression of the bushing material surrounding the ball joints. In the present invention I have provided a method whereby the bushing may be conveniently and accurately positioned each time around the ball joints and the unit directly assembled and the correct pressure given to the bushing merely by such assembly.

In the drawings:

Fig. 1 is a somewhat diagrammatic view illustrating the first step of my preferred method.

Fig. 2 is a bottom plan view of the structure shown in Fig. 1 and illustrating the step preparatory to wrapping a length of lubricant impregnated fibrous material around the ball joint.

Fig. 3 illustrates the second step of my method wherein the bushing is shown wrapped around the ball joint.

Fig. 4 is a bottom plan view of the ball joint at this second step.

Fig. 5 illustrates the third step in the method wherein an annular ring is forced around the bushing to hold the same in wrapped position.

Fig. 6 illustrates the preferred shape which my link takes prior to assembly and the manner of inserting the assembled ball joint and bushing prior to final assembly.

Fig. 7 illustrates the step of positively positioning and shaping the bushing merely by assembly of the two halves of the link unit.

Fig. 8 illustrates the final step of my novel method wherein the flange of one of the halves is bent over to permanently unite the two halves as a single integral link.

Fig. 9 is a sectional view taken on line 9—9 of Fig. 10.

Fig. 10 is a plan view of the final completed connecting link.

The connecting link structure of the present application is quite similar to that illustrated in my copending application No. 412,682, the connecting link and bearing housings being integrally formed of sheet metal stampings. The principal feature of the present invention resides in the method of assembly and the manner of arranging and positioning the bushing as a step in this method of assembly.

Due to the quick stamping operation in assembling a unit of this type, it will be obvious that the positioning of the lubricant impregnated fibrous material forming the bushing becomes a very important factor. If such bushing is slightly out of position, the bearing housing might not only be improperly formed and rounded out, but, most important of all, unequal or improper pressure will very often be applied to the bushing.

The placing of the bushing under compression during assembly and the maintenance of this bushing under compression is, of course, the final result aimed at, and to accomplish this result merely by assembling the preformed connecting link, instead of by distorting certain walls thereof, I preferably temporarily form the bushing around the ball joint as the first step in the method. As best shown in Figs. 1 and 2, a standard ball joint is indicated as at 1 and a strip of lubricant impregnated fibrous material as at 2. Such fibrous material may be held in the position shown in Fig. 2 by means of suitable dies or otherwise, and by means of these same dies, such as shown at 3 in Fig. 3, this strip of fibrous material may be wrapped and formed around the ball joint as best shown in Figs. 3 and 4.

Below the dies 3 may be positioned a suitable plunger as shown in dotted lines at 10c 4, in which plunger may be positioned an annular ring member 5. After the strip of lubricant impregnated fibrous material 2 has been wrapped around the ball joint, as shown in Fig. 3, the plunger 4 may be moved upwardly until the ring 5 is positioned around the bushing 2. The dies 3 may then be withdrawn and the plunger and ring 5 further moved towards and around the ball joint 1. The annular ring 5 is so pressed around the ball joint 1 and bushing 2 that it slightly compresses the bushing and is held in place by friction. It will be obvious that this annular ring 5 will thus hold the strip of lubricant impregnated fibrous material securely wrapped around the ball joint.

The connecting link preferably comprises two substantially symmetrical halves 6 and 7, as best shown in Fig. 6. Each half has a bearing housing 8 and 9 formed integrally at each end thereof, the bearing housing 8 being shaped to form the annularly depressed shoulders 10, and the bearing housing 9 being formed with an aperture 11, the immediate walls of which are cupped in, as best shown in Fig. 6. One of the halves is formed with a straight flange 12 while the other half is formed with an annular flange 13 for receiving the flange 12.

In assembling the complete unit, as best shown in Fig. 6, the ball stud, together with the assembled bushing 2 and ring 5, is inserted in the half 7 provided with the aperture 11, the shank of the ball stud being inserted through the aperture 11 as illustrated in Fig. 6. The ring 5 will hold the bushing 2 securely about the ball stud and the pushing of the shank of the stud through the aperture 11 will cause the lower ends of the bushing to contact with the cupped ends of the housing 9, to also assist in positioning the bushing.

The thickness of the bushing 2 will, of course, be predetermined as well as the diameter of the ring 5. The upper half 6 may then be lowered in position over the two ball studs and suitable pressure applied so that the flange 12 is forced "home" within the flange 13. The bushings 2 will be compressed to the desired amount and uniform in each case because of the predetermined positioning of each bushing member. Furthermore, the lower edge of the housing 8 is so shaped as to contact with the curved surface of the ring 5 so as to assist in further compressing the bushing 2. The manner in which the lower edge of the housing 8 complementally fits the ring 5 and assists in compressing the bushing will clearly be seen by comparing Figs. 6 and 7.

While the two halves 6 and 7 are securely pressed together, as shown in Fig. 7, the flange 12 may be turned over to form the permanent joint as shown at 14 in Figs. 8 and 9.

Thus it will be seen that I have provided a link structure having an integral bearing housing at one or both ends thereof, wherein the bushing in said housing is positively shaped and compressed without the necessity of any deforming of the housing. Probably the most important feature both in the method and in the final article is the use of the ring 5 for temporarily holding and positively positioning the bushing around the ball joint preparatory to final assembly. It will also be obvious that in addition to temporarily holding and positioning the bushing that this ring also materially assists in producing compression of the bushing during final assembly. It will be understood that other means or rings of different shapes may be utilized in carrying out the present invention, and that broadly the present invention embodies the particular novel step of accurately positioning the bushing material around the ball joint prior to and during assembly of the link halves.

In addition to providing an extremely compact and stronger connecting link, by reason of forming the same of two stampings closed together as a single unit, it will be obvious that I have further increased the strength of such unit by forming the final bearing housings and compressing the bushing without distorting such bearing housing in any manner. The assembled ball joints and bushing may be inserted in place by the operator and the two halves of the link brought together without any further attention having to be paid to the position of the ball studs. Even if the shanks of the ball studs should be slightly out of vertical alignment in the step shown in Fig. 6, it will be obvious that the bushing will still be correctly positioned so as to be compressed and correctly shaped around the spherical head of the ball stud.

What I claim is:

1. The method of forming self-aligning, self-lubricating bearings, which comprises forming an outer bearing member in two parts, temporarily positioning a layer of lubricant impregnated fibrous material around a spherical bearing member by means of an annular ring, inserting said spherical bearing member and temporarily positioned lubricant impregnated material within one of said parts whereby said lubricant impregnated material and bearing member part are correctly arranged, and then bringing the two parts of said outer bearing member together to shape and compress said lubricant impregnated material to form a permanent bushing around the spherical inner bearing.

2. The method of forming unitary self-aligning, self-lubricating bearings of the type wherein the inner spherical member is in the form of a ball stud, which comprises first wrapping bushing material formed of lubricant impregnated fibrous material around the ball stud, temporarily fixing said material in such wrapped position, forming the outer spherical bearing member in two parts, one part having an aperture for receiving the shank of the ball stud, inserting the shank of the ball stud through the aperture whereby to positively position the bushing material, and then closing the two parts together around the positively positioned bushing material whereby to compress and shape the same around the ball stud and permanently lock said two parts together.

3. The method of forming spherical self-aligning, self-lubricating bearings, which comprises wrapping a strip of self-lubricating material around the inner spherical bearing, temporarily securing said strip of material in position around said bearing, forming the outer spherical bearing member in two parts, positioning the inner spherical member with its temporarily positioned lubricant impregnated material in position in one of said parts, and then bringing said two parts together to permanently position said temporary positioning means and to compress and shape said self-lubricating material as a permanent bushing around the inner spherical member, and then securing said two parts together while in such position.

4. The method of forming self-aligning, self-lubricating bearings, which comprises forming an outer spherical bearing member in two halves, one half being provided with an aperture having an inturned portion, temporarily positioning a length of lubricant impregnated fibrous material around an inner spherical bearing member so as to form an annular bushing around the same, positioning said inner bearing member and bushing within said apertured half whereby one edge of the bushing contacts with the inturned portion to positively position the bushing relative to the outer bearing half, and then permanently bringing the two halves of said outer bearing member together to compress and shape said bushing around said inner bearing member.

5. The method of forming a permanent self-lubricating connecting unit for shock absorbers and the like, which comprises integrally forming a link and spaced bearing housings in two longitudinal halves, temporarily securing a bushing of lubricant impregnated fibrous material around the spherical head of a ball stud, inserting said ball stud and bushing in one of said bearing housings whereby to automatically position the bushing material in alignment with the axis of said bearing housing, complementally positioning the halves together to compress the bushing and complete the bearing housings and the link, and permanently securing said halves together to form an integral unit consisting of integral bearing housings and an integral connecting link.

6. The method of forming a permanent connecting unit for shock absorbers and the like of the type having spaced bearing housings and a connecting link, which comprises forming the bearing housings and the connecting link in two integral parts, forming one or more of the bearing housings in one of said parts with an aperture having an annular inturned edge, securing a strip of lubricant impregnated fibrous material around the spherical head of a ball stud, inserting the shank of the ball stud through said aperture or apertures whereby said bushing is positively positioned within the bearing housing or housings, said bushing contacting with the inturned edge of said aperture or apertures to assist in positioning the same, and securing the two parts together to permanently lock the unit in assembled relation by distorting one of said parts to lock the other part in permanent complemental position.

7. The method of forming a permanent connecting unit for shock absorbers and the like, which comprises integrally forming a link and spaced bearing housings in two longitudinal halves, forming apertures in the spaced bearing housings of one half, temporarily wrapping bushing material around the spherical heads of ball studs and inserting the shanks of the ball studs through said apertures, said bushing material being positively positioned and of a predetermined thickness, and then complementally bringing the halves together and placing the same under pressure whereby to compress and shape the bushing material around the spherical heads of the ball studs.

8. The method of forming a permanent connecting unit for shock absorbers and the like, which comprises integrally forming a link and spaced bearing housings in two longitudinal halves, forming apertures in the spaced bearing housings of one half, temporarily wrapping bushing material around the spherical heads of ball studs and inserting the shanks of the ball studs through said apertures, said bushing material being positively positioned and of a predetermined thickness, then complementally bringing the halves together and placing the same under pressure whereby to compress and shape the bushing material around the spherical heads of the ball studs, and permanently securing said two halves together by distorting a portion of one of the halves into locking relation with the other.

9. The method of forming a self-aligning, self-lubricating bearing of the type having an outer spherical shell and an inner spherical member, which comprises forming the outer shell in two parts, wrapping a strip of lubricant impregnated material around the inner spherical member whereby to form an annular bushing, temporarily securing said bushing in place around said inner member by placing a ring around said annular bushing, positioning said inner spherical member and its temporarily positioned bushing within one of said halves, and then bringing said two halves together whereby to shape and permanently compress the bushing around the spherical inner member.

10. The method of forming a self-aligning, self-lubricating bearing of the type having an outer spherical shell and an inner spherical member, which comprises forming the outer shell in two parts, wrapping a strip of lubricant impregnated material around the inner spherical member whereby to form an annular bushing, temporarily securing said bushing in place around said inner member by placing a ring around said annular bushing, positioning said inner spherical member and its temporarily positioned bushing within one of said halves, and then bringing said two halves together whereby to shape and permanently compress the bushing around the spherical inner member, one of said halves contacting with said ring during said final assembly whereby to further press the same around the bushing.

11. The method of forming a self-aligning, self-lubricating bearing of the type having a permanent outer shell and an inner spherical member, which comprises forming the outer shell in two parts, positioning a strip of lubricant impregnated material within one part of said outer shell to form an annular bushing for said spherical member, temporarily securing said bushing in place around said spherical member by placing a ring around one end of said annular bushing and then bringing said two parts of said outer shell together whereby to shape and permanently compress the bushing around the spherical inner member, and then locking said two parts together to form a permanent outer bearing shell and hold said bushing and spherical member in their compressed positions.

12. The method of forming self-aligning, self-lubricating bearings, which comprises forming an outer bearing member in two parts, inserting an inner spherical member and an annular layer of lubricant impregnated fibrous material within one of said outer bearing parts, temporarily positioning and compressing the fibrous material around the inner spherical member by means of an annular ring, and then bringing the two parts of said outer bearing member together to permanently compress and shape the lubricant impregnated material around the spherical inner bearing.

13. The method of forming self-aligning, self-lubricating bearings, which comprises forming an outer bearing member in two parts, inserting an inner spherical member and an annular layer of lubricant impregnated fibrous material within one of said outer bearing units, temporarily positioning and compressing the fibrous material around the inner spherical member by means of an annular ring, then bringing the two parts of said bearing member together to permanently compress and shape the lubricant impregnated material around the spherical inner bearing, and then turning over a portion of one of said parts to engage and permanently lock the other part.

14. In the method of forming self-aligning, self-lubricating bearings of the type having a permanent outer shell and a substantially spherical inner bearing unit having a stud, the steps which consist in forming the outer shell in two parts, one part having a cupped-in portion forming an aperture and the other part being solid, forming a layer of compressible and expansible self-lubricating bushing material to fit within said apertured part, positioning said inner bearing unit within said material and said apertured part, the stud thereof, protruding through the aperture and the cupped-in portion of the aperture contacting with one end of the layer of bushing material, positioning the solid part of the outer shell against said bushing material to compress and shape the same whereby said bushing material acts expansively against the outer surfaces of the inner bearing and the inner surfaces of said outer shell, and then distorting a portion of one part of the outer shell to contact with the other part and form an enclosing permanent outer bearing unit.

15. In the method of forming self-aligning bearings of the type having a two-part outer shell and a ball stud, the steps which consist in positioning a layer of compressible bushing material and the ball within one part of the outer shell, placing a ring around a portion of said bushing material and placing said bushing material under compression by bringing said other part into contact with said ring and into assembly relation with the first named part, and securing the two parts together while the bushing material is held under compression.

16. The method of forming self-aligning, self-lubricating bearings, which comprises initially assembling a substantially spherical inner bearing unit and a layer of lubricant impregnated compressible bushing material within an outer bearing shell having an annular cupped-in end terminating in an aperture of less diameter than the inner bearing unit and forming a stop for the bushing material, placing the portion of the bushing material opposite said cupped-in end under compression by moving a cap portion, axially of said aperture, and into contact with a ring positioned at one end of the bushing material, and holding said cap and ring in position to maintain the bushing material under compression by securing said outer bearing shell and said cap portion in relatively immovable positions.

17. In the method of forming self-aligning, self-lubricating bearings of the type having a substantially spherical inner bearing unit and a layer of bushing material acting expansively against said unit and an enclosing outer bearing shell of longitudinally varying contour, the steps which consist in positioning the substantially spherical inner bearing unit and a layer of compressible bushing material within said shell, said bushing material bearing against an inwardly extending portion of the shell, compressing the bushing material by applying pressure to annular ring positioned to contact with a portion of the bushing material, and then distorting a portion of the wall of said outer shell to lock said ring in position while the bushing material is being held under compression.

In testimony whereof I affix my signature.

NEWTON SKILLMAN.